US012725921B2

(12) United States Patent
Tsai et al.

(10) Patent No.: US 12,725,921 B2
(45) Date of Patent: Sep. 1, 2026

(54) ELECTRONIC DEVICE

(71) Applicant: InnoLux Corporation, Miao-Li County (TW)

(72) Inventors: Tsung-Han Tsai, Miao-Li County (TW); Liang-Yun Chiu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 139 days.

(21) Appl. No.: 18/414,804

(22) Filed: Jan. 17, 2024

(65) Prior Publication Data

US 2024/0178559 A1 May 30, 2024

Related U.S. Application Data

(63) Continuation of application No. 17/848,499, filed on Jun. 24, 2022, now Pat. No. 11,909,128, which is a continuation of application No. 16/991,187, filed on Aug. 12, 2020, now Pat. No. 11,394,117.

(30) Foreign Application Priority Data

Sep. 5, 2019 (CN) ......................... 201910837182.0

(51) Int. Cl.

| | |
|---|---|
| ***H01Q 3/36*** | (2006.01) |
| ***H01Q 1/22*** | (2006.01) |
| ***H01Q 1/38*** | (2006.01) |
| ***H01Q 3/32*** | (2006.01) |
| ***H01Q 3/44*** | (2006.01) |
| ***H01Q 21/06*** | (2006.01) |
| ***H01Q 23/00*** | (2006.01) |

(52) U.S. Cl.
CPC ............. *H01Q 3/36* (2013.01); *H01Q 1/2283* (2013.01); *H01Q 1/38* (2013.01); *H01Q 3/32* (2013.01); *H01Q 3/44* (2013.01); *H01Q 21/06* (2013.01); *H01Q 23/00* (2013.01)

(58) Field of Classification Search
CPC .......... H01Q 1/2283; H01Q 1/38; H01Q 1/48; H01Q 1/50; H01Q 3/36; H01Q 3/32; H01Q 3/44; H01Q 3/34; H01Q 21/06; H01Q 21/293; H01Q 21/0006; H01Q 23/00; H01L 23/66; H10W 70/09; H10W 72/823; H10W 74/012; H10W 74/111–124
See application file for complete search history.

(56) References Cited

U.S. PATENT DOCUMENTS

2018/0358685 A1* 12/2018 Han ........................ H01Q 21/06
2019/0019758 A1* 1/2019 Kim .................... H10W 70/614

* cited by examiner

*Primary Examiner* — Robert Karacsony
(74) *Attorney, Agent, or Firm* — McClure, Qualey & Rodack, LLP

(57) ABSTRACT

An electronic device includes a substrate, plurality of electrodes disposed on the substrate, a plurality of metal elements disposed on the substrate, a plurality of first lines disposed on the substrate, and a radio frequency signal processor. One of the plurality of metal elements is overlapped one of the plurality of electrodes. The radio frequency signal processor provides a signal to the one of the plurality of electrodes through one of the plurality of first lines.

7 Claims, 10 Drawing Sheets

100

100

100

100

ELECTRONIC DEVICE

CROSS REFERENCE TO RELATED APPLICATIONS

This application is a Continuation Application of U.S. patent application Ser. No. 17/848,499, filed on Jun. 24, 2022, now U.S. Pat. No. 11,909,128, which claims priority to U.S. patent application Ser. No. 16/991,187, filed on Aug. 12, 2020, now U.S. Pat. No. 11,394,117, and China application No. 201910837182.0, filed on Sep. 5, 2019, the entirety of which is incorporated by reference herein.

FIELD OF THE PRESENT DISCLOSURE

The present disclosure relates to an electronic device, and in particular it relates to an electronic device having at least one radio frequency signal processor.

DESCRIPTION OF THE RELATED ART

An electronic device (such as a liquid-crystal antenna) can utilize a resonance characteristic to allow a radio frequency signal with a specific frequency to flow into the electronic device through a feeding structure. If there are more bifurcation paths in the feeding structure, the noise of the radio frequency signal may be greater. Therefore, it is necessary to continue to develop electronic devices in which the above problem is improved.

BRIEF SUMMARY OF THE PRESENT DISCLOSURE

In order to resolve the problem described above, the present disclosure discloses an electronic device, comprising a substrate, a plurality of phase shift units, a feeding structure, and a radio frequency signal processor. The phase shift units are disposed on the first substrate. The feeding structure is disposed on the first substrate. The radio frequency signal processor is for altering a radio frequency signal transmitted through at least part of the feeding structure.

DETAILED DESCRIPTION OF THE PRESENT DISCLOSURE

Figure 1:
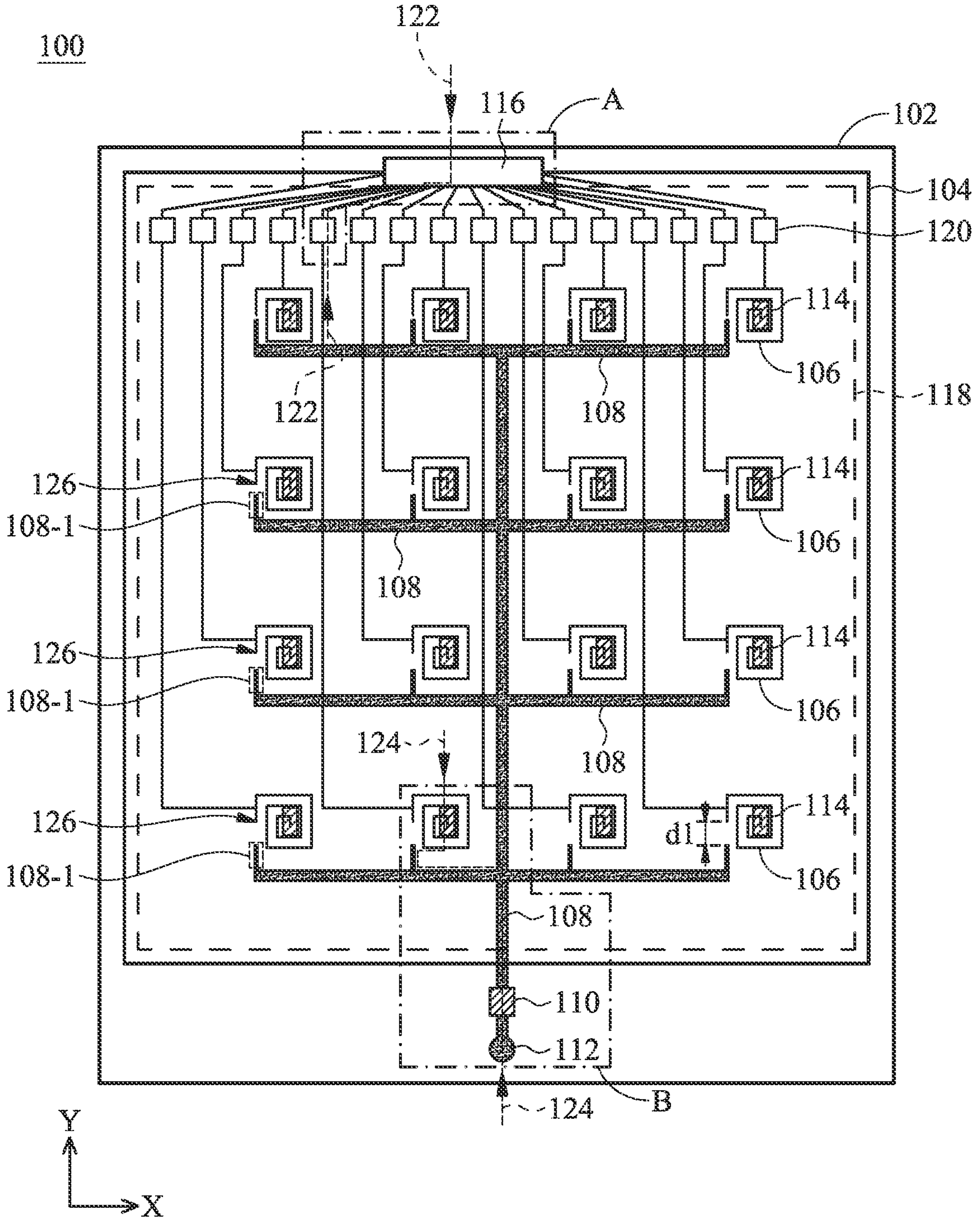
FIG. 1 is a schematic diagram of an electronic device in accordance with some embodiments of the disclosure.

The disclosure can be understood by referring to the following detailed description and the accompanying drawings. In order for readers to easily understand, and for the simplicity of the drawings, the multiple drawings in the disclosure only depict a part of an electronic device, and the specific components in the drawings are not drawn to scale. In addition, the number and size of various components in the figures are for illustrative purposes only, and are not intended to limit the scope of the disclosure.

The whole specification and the appended claims may use certain terms to refer to particular elements. Persons skilled in the art may understand that electronic device manufacturers may refer to the same element by different names. The disclosure is not intended to distinguish between elements that have the same function but have different names. In the following description and claims, the words "having" and "comprising" are interpreted as "comprising but not limited to".

The terms "about", "equal to", "same" or "identical" generally mean a value is within a range of 20% of a given value, or within ranges of 10%, 5%, 3%, 2%, 1% or 0.5% of the given value.

In the disclosure, the same or similar elements are designated by the same or similar numerals, and the description thereof is omitted. In addition, the features of the different embodiments may be arbitrarily mixed and used without departing from the spirit of the disclosure, and the simple equivalent changes and modifications made from the specification or the claims are still within the scope of the disclosure. in addition, the terms "first", "second" and the like mentioned in the specification or the claims are used to identify discrete elements or to distinguish different embodiments or ranges, and are not intended to limit the upper or lower limits of the number of elements, and are not intended to limit the manufacturing order or the disposing order of the elements.

FIG. 1 is a schematic diagram of an electronic device in accordance with some embodiments of the disclosure. As shown in FIG. 1, an electronic device 100 includes a first substrate 102, a second substrate 104, a plurality of phase shift units 106, a feeding structure 108, a radio frequency signal processor 110, a signal feeding point 112, a plurality of patch elements 114, a control circuit 116, a sealant 118, and a plurality of contact pads 120. In some embodiments, the electronic device 100 may include a display device, an antenna device, a sensing device, a tiled device, or other suitable device, but is not limited thereto. The antenna device can be, for example, a liquid-crystal antenna, but is not limited thereto. The tiled device can be, for example, a tiled display device, a tiled sensor device, or a tiled antenna device, but is not limited thereto. It is noted that the electronic device 100 can be any combination of the foregoing devices, but us not limited thereto. The feeding structure 108 is electrically coupled to the radio frequency signal processor 110, and the signal feeding point 112 is electrically coupled to the radio frequency signal processor 110. A radio frequency signal is input from the signal feeding point 112 to the electronic device 100. The radio frequency signal processor 100 is for altering a radio frequency signal transmitted through at least part of the feeding structure. To be more specific, the radio frequency signal processor 110 receives the radio frequency signal and provides an altered radio frequency signal to the phase shift units 106 through the feeding structure 108. In some embodiments, the phase shift units 106 are electrically coupled to the control circuit 116 through the contact pads. In some embodiments, the frequency of the radio frequency signal may be between 0.7 GHz and 300 GHz (0.7 GHz≤frequency≤300 GHz), but the disclosure is not limited thereto. Furthermore, the distance between the phase shift unit 106 and the adjacent phase shift unit 106 is set between 0.5λ to 0.8λ (0.5λ≤distance≤0.8λ) according to the wavelength λ of the radio frequency signal, and the distance can be a minimum distance between the phase shift unit 106 and an adjacent phase shift unit 106, but the disclosure is not limited thereto. In some embodiments, the shape of the phase shift units 106 may be spiral, but the disclosure is not limited thereto. In some embodiments, the phase shift units 106 can be phase shift electrode units. In FIG. 1, the direction from the left to the right is the X direction, and the direction from the bottom to the top is the Y direction.

Figure 2:
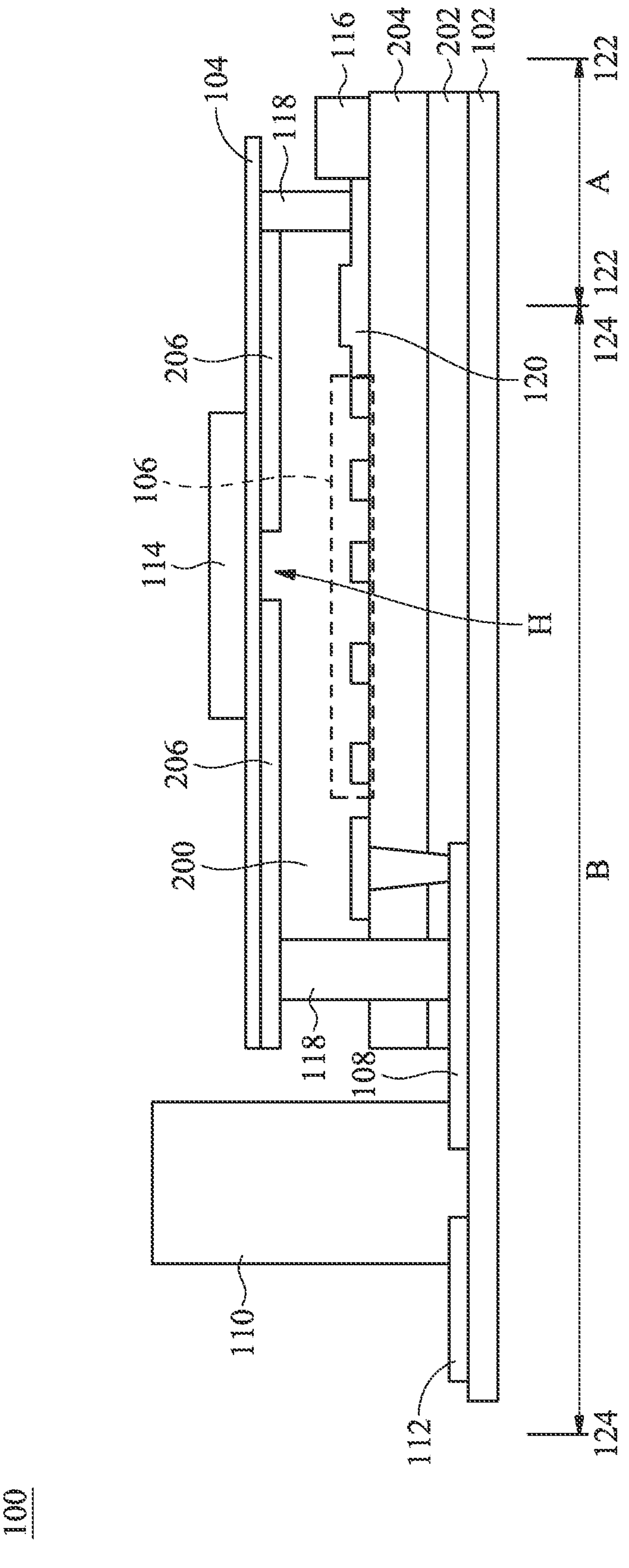
FIG. 2 is a schematic diagram of an internal structure of the electronic device in FIG. 1 in accordance with some embodiments of the disclosure.

FIG. 2 is a schematic diagram of an internal structure of the electronic device in FIG. 1 in accordance with some embodiments of the disclosure. The internal structure of the elements in area A is observed in a side view along the cutting line 122 in FIG. 1, and the internal structure of the elements in area B is observed in a side view along the cutting line 124 in FIG. 1. FIG. 2 is a combination of the internal structure diagram of the elements in area A and the internal structure diagram of the elements in area B. As shown in FIG. 2, the phase shift units 106 are disposed on the first substrate 102, and there are a dielectric layer 202 and a dielectric layer 204 disposed between the phase shift units 106 and the first substrate. The electronic device 100 further includes a second substrate 104, the second substrate 104 is disposed on the phase shift units 106. The feeding structure 108 and the radio frequency signal processor 110 are both disposed on the first substrate 102, and the radio frequency signal processor 110 sends the radio frequency signal from the signal feeding point 112 to the phase shift units 106 through the feeding structure 108. In some embodiments, the disclosure provides that the radio frequency signal processor 110 is disposed on the first substrate 102, and the radio frequency signal processor 110 can be coupled to the feeding structure 108. Therefore, the radio frequency signal processor 110 and the phase shift units 106 (or the feeding structure 108) are disposed on the same side of the first substrate 102.

Referring to FIG. 1, in some embodiments, the feeding structure 108 has a plurality of bifurcated structures, a plurality of bifurcated feeding lines 108-1 are formed in the bifurcated structures, and an end of the bifurcated feeding lines 108-1 corresponds (e.g. face-to-face or parallel) to input ends 126 of the phase shift units 106. The ends of the bifurcated feeding lines 108-1 couple the radio frequency signal to the phase shift units 106 by using electromagnetic radiation. In some embodiments, the distance d1 between the end of the bifurcated feeding lines 108-1 and the input ends 126 of the phase shift units 106 is between 0.5 mm and 5 mm (0.5 mm≤distance d1≤5 mm), but the disclosure is not limited thereto. In some embodiments, as shown in FIG. 1, the distance d1 between the end of the bifurcated feeding lines 108-1 and the input end 126 of the phase shift units 106 refers to a minimum distance between the end of the bifurcated feeding lines 108-1 and the input end 126 of the phase shift units 106 along the extending direction (for example, the Y direction) of the bifurcate feeding lines 108-1.

In some embodiments, the patch elements 114 are disposed on the second substrate 104 (referring to FIG. 2), the patch elements 114 at least partially overlap the phase shift units 106 in a normal direction of the first substrate 102. Referring to FIG. 2, the electronic device 100 further includes a ground metal layer 206. The ground metal layer 206 and the patch elements 114 are disposed on different sides of the second substrate 104, and the ground metal layer 206 is disposed between the first substrate 102 and the second substrate 104. The electronic device 100 further includes a liquid-crystal material 200 filled in a space substantially surrounded by the first substrate 102, the second substrate 104, and the sealant 118. It should be noted that the ground metal layer 206 has a hole H in the portion below the patch elements 114, and the radio frequency signal adjusted by the liquid-crystal material 200 can be transmitted through the hole H to the patch elements 114, and then the radio frequency signal is radiated by the patch elements 114.

In some embodiments, the sealant 118 may surround the liquid-crystal material 200 and at least partially overlap the feeding structure 108 along the normal direction of the first substrate 102. The sealant 118 may be used to support the second substrate 104 on the first substrate 102. The sealant 118, the first substrate 102 and the second substrate 104 may form an accommodating space surrounding the liquid-crystal material 200 to form a liquid-crystal cell (LC cell) to reduce the chance of leakage of the liquid-crystal material 200. In some embodiments, the liquid-crystal material 200 may be used to modulate the phase of an input radio frequency signal. The liquid-crystal material 200 may include a phase-aligned liquid-crystal, a cholesterol liquid-crystal, a blue-phase liquid-crystal, or the like having a high anisotropy crystal, and the thickness thereof is between 3 μm and 150 μm (3 μm≤thickness≤150 μm), but the disclosure is not limited thereto. The control circuit 116 is electrically connected to the phase shift units 106 through the contact pads 120 to provide a voltage to the phase shift units 106. In some embodiments, the voltage (e.g. low frequency voltage) provided by the control circuit 116 forms an electric field between the phase shift units 106 and the ground metal layer 206 for regulating the rotation of molecules of the liquid-crystal material 200. When a radio frequency signal passes through the molecules of the liquid-crystal material 200, the phase of the radio frequency signal may be changed such that the patch element 114 can radiate the multi-beam field pattern and control the directivity of its radiation pattern. In a typical application, the voltage provided by the control circuit 116 ranges from ±0.1V to ±100V, but the disclosure is not limited thereto. In some embodiments, the voltage provided by the control circuit 116 ranges from ±1V to ±15V, but the disclosure is not limited thereto.

Figure 3:
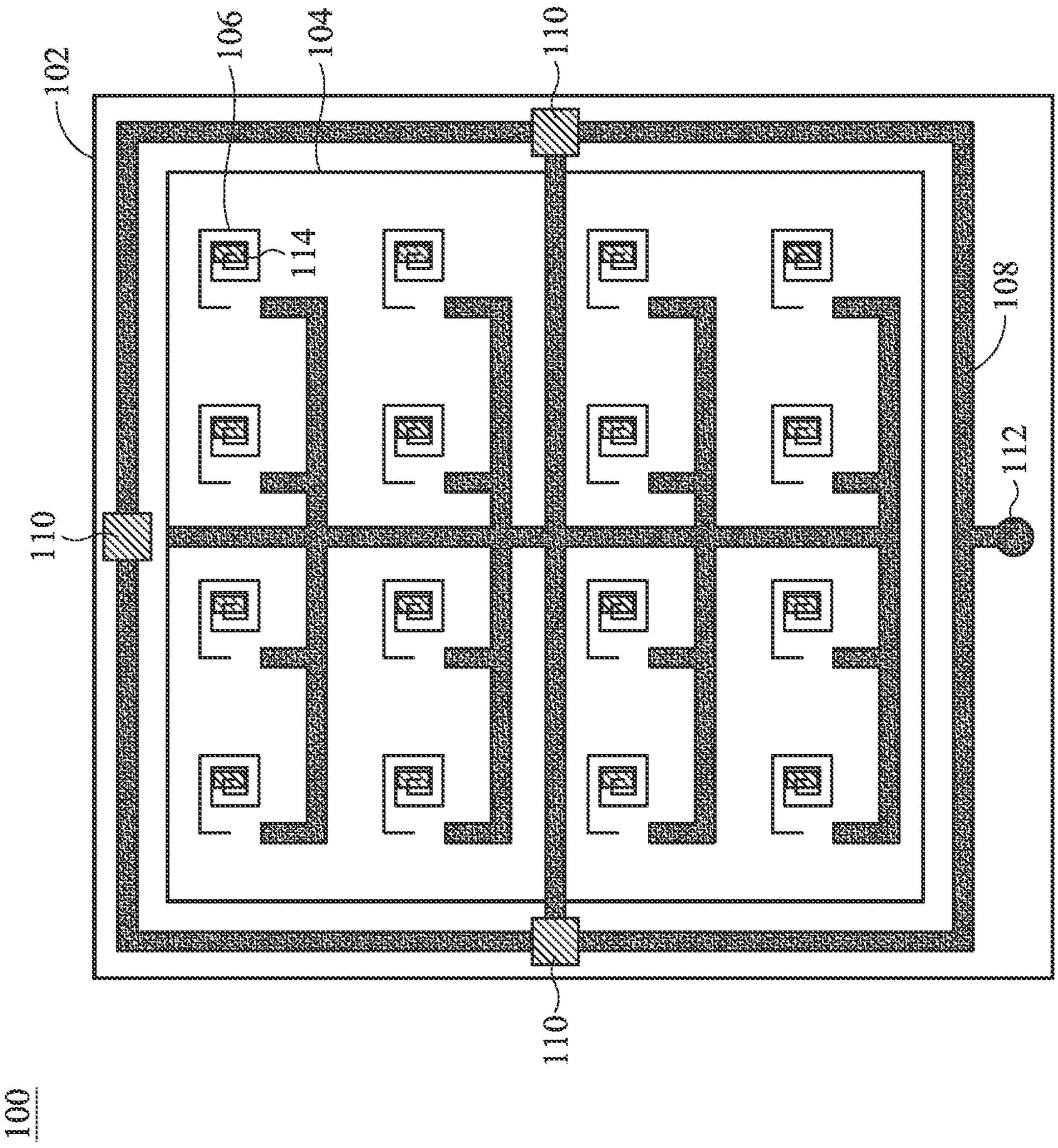
FIG. 3 is a schematic diagram of the electronic device in accordance with some embodiments of the disclosure.

FIG. 3 is a schematic diagram of the electronic device 100 in accordance with some embodiments of the disclosure. As shown in FIG. 3, a plurality of radio frequency signal processors 110 are disposed on the first substrate 102, but do not overlap the second substrate 104 along the normal direction of the first substrate 102. The radio frequency signal processors 110 are respectively disposed on, for example, the upper side, the left side, and the right side of the first substrate 102. The feeding structure 108 surrounds the circumference of the second substrate 104, and the radio frequency signal processors 110 are electrically connected to each other through the feeding structure 108. In some embodiments, the radio frequency signal processors 110 are electrically connected to the signal feeding point 112 through the feeding structure 108.

Figure 4:
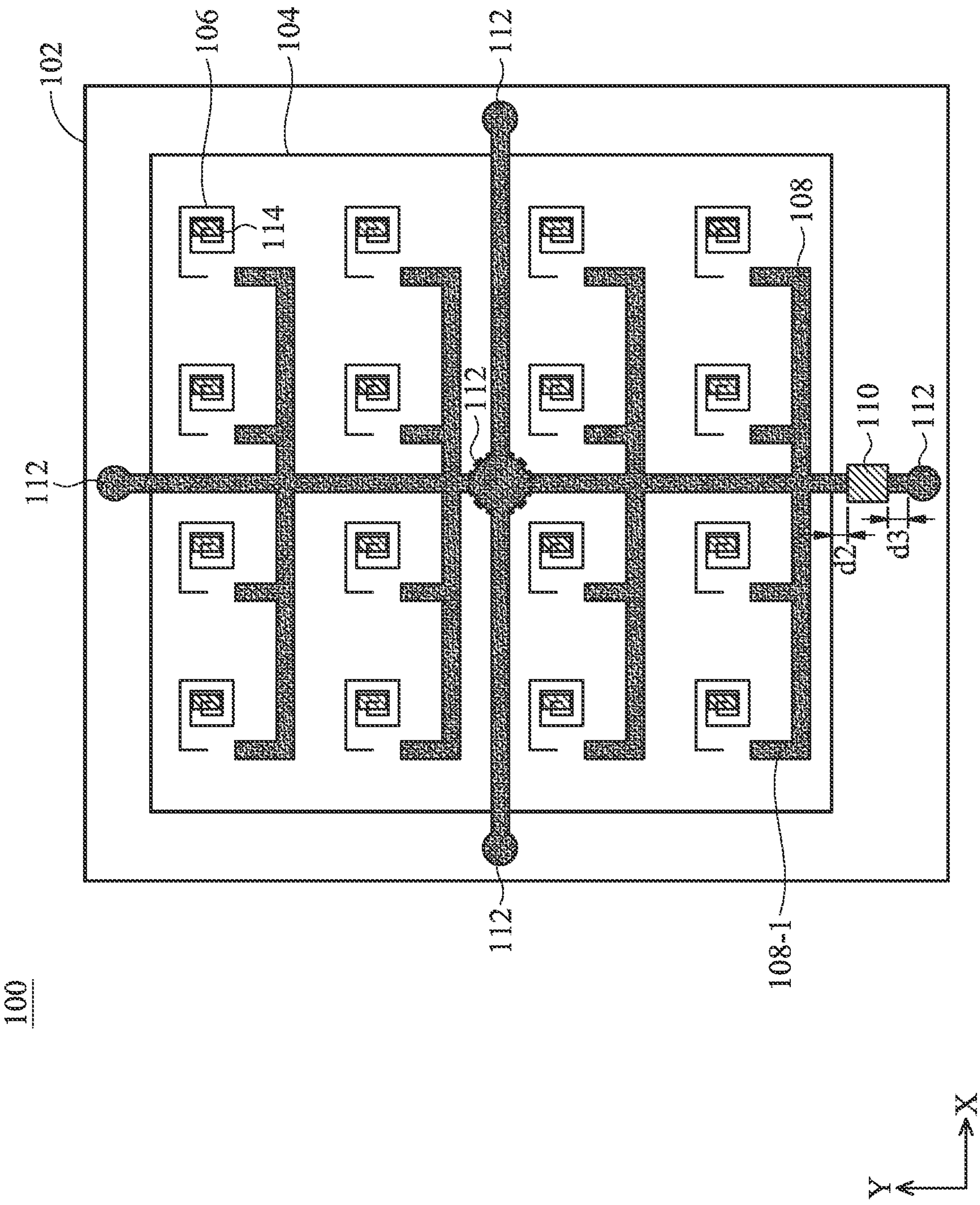
FIG. 4 is a schematic diagram of the electronic device in accordance with some embodiments of the disclosure.

FIG. 4 is a schematic diagram of the electronic device in accordance with some embodiments of the disclosure. As shown in FIG. 4, the electronic device 100 includes a plurality of signal feeding points 112, for example, electronic device 100 may include five signal feeding points 112, but the disclosure is not limited thereto. The signal feeding points 112 include a midpoint feeding point located near the center of the second substrate 104, and omnidirectional feeding points respectively located at the upper, lower, left, and right edges of the first substrate 102. The omnidirectional feeding points are electrically connected to the midpoint feeding point and the radio frequency signal processor 110 through the feeding structure 108. The radio frequency signal is input to the electronic device 100 from the midpoint feeding point and the omnidirectional feeding points, respectively. In some embodiment, the midpoint feeding point and the omnidirectional feeding point are disposed on different surfaces of the first substrate 102, and are electrically connected to each other via the through holes. In some embodiments, a minimum distance d2 between the radio frequency signal processor 110 and the edge of the second substrate 104 is at least 5 μm, but the disclosure is not limited thereto. In addition, a minimum distance d3 between the radio frequency signal processor 110 and the lower edge of the first substrate 102 is at most 5 mm, but the disclosure is not limited thereto. In some embodiments, as shown in FIG. 4, the minimum distance d2 between the radio frequency signal processor 110 and the edge of the second substrate 104 or the minimum distance d3 between the radio frequency signal processor 110 and the lower edge of the first substrate 102 refers to a minimum distance along the extending direction (for example, the Y direction) of the bifurcated feeding lines 108-1. According to the configurations in FIG. 3 and FIG. 4, the disclosure does not limit the number of radio frequency signal processors 110 or the number of feeding points 112 in the electronic device 100. In some embodiments of the disclosure from FIG. 1 to FIG. 4, because the height of the radio frequency signal processor 110 is greater than that between the first substrate 102 and the second substrate 104, the radio frequency signal processor 110 may be disposed on the first substrate 102. Also, the radio frequency signal processor 110 does not overlap the second substrate 104 along the normal direction of the first substrate 102. In some embodiments of the disclosure, the thickness of the radio frequency signal processor 110 may be between 10 μm and 1 mm (10 μm≤thickness≤1 mm), and the radio frequency signal processor 110 is not disposed between the first substrate 102 and the second substrate 104, but the disclosure is not limited thereto.

Figure 5:
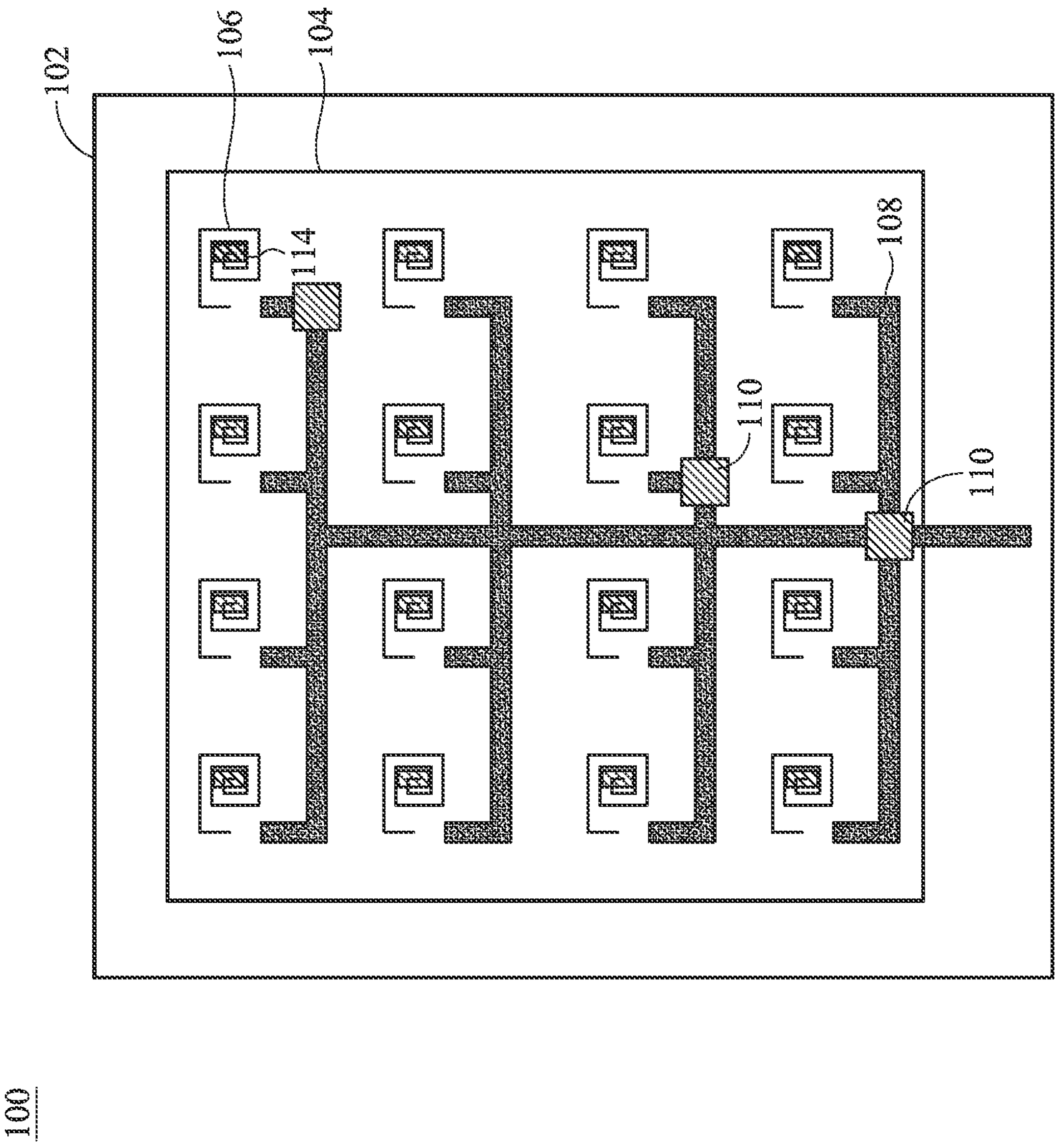
FIG. 5 is a schematic diagram of the electronic device in accordance with some embodiments of the disclosure.
Figure 6:
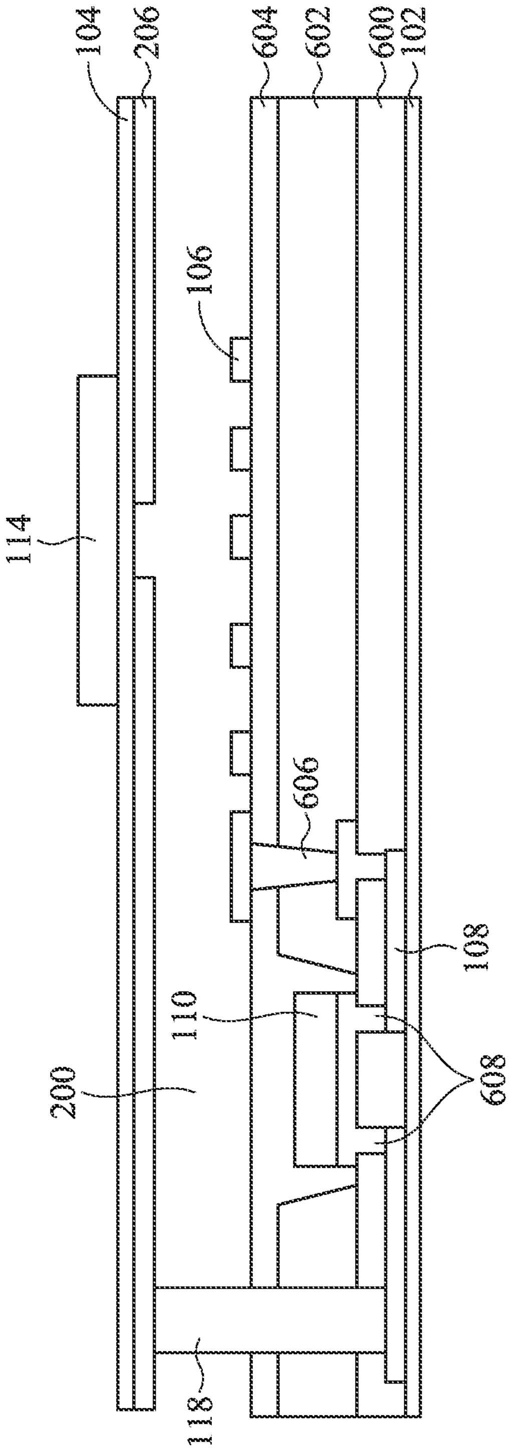
FIG. 6 is a schematic diagram of an internal structure of the electronic device in FIG. 5 in accordance with some embodiments of the disclosure.

FIG. 5 is a schematic diagram of the electronic device in accordance with some embodiments of the disclosure. FIG. 6 is a schematic diagram of an internal structure of the electronic device in FIG. 5 in accordance with some embodiments of the disclosure. As shown in FIG. 5 and FIG. 6, a plurality of radio frequency signal processors 110 (for example, 3 radio frequency signal processors 110) are disposed between the first substrate 102 and the second substrate 104. As shown in FIG. 6, a buffer layer 600, a dielectric layer 602 and a cover layer 604 are further included between the first substrate 102 and the phase shift units 106. In some embodiments of the disclosure, the radio frequency signal processor 110 is placed in a through hole structure 608 of the dielectric layer 602 by surface mount technology (SMT), and the radio frequency signal processor 110 is covered with the cover layer 604. In some embodiments, the radio frequency signal processor 110 may be a wafer using a flip chip package, a vertical package, or the like. For example, the flip-chip radio frequency signal processor 110 electrically couples the radio frequency signal processor 110 to the feeding structure 108 through the through hole structure 608, and transmits an altered radio frequency signal to the phase shift units 106 through the through hole structure 606. The through hole structure 606 and the through hole structure 608 can be accomplished, for example, by dry etching and/or wet etching. The material of the through hole structure 606 and the through hole structure 608 may include any conductive metal, conductive oxide, anisotropic conductive film (ACF) conductive paste, conductive resin or another suitable conductive material. However, the disclosure is not limited thereto.

In some embodiments, the material of the buffer layer 600 and the cover layer 604 may include an inorganic insulating layer and/or an organic insulating layer having a thickness between 50 nm and 500 nm (50 nm≤thickness≤500 nm), but the disclosure is not limited thereto. The phase shift units 106, the ground metal layer 206, the patch elements 114, and the circuit elements or trace lines inside the radio frequency signal processor 110 in the electronic device 100 may respectively include a metal such as molybdenum (Mo), aluminum (Al), copper (Cu), titanium (Ti), or a conductive metal oxide such as indium tin oxide (ITO), indium zinc oxide (IZO), or stannous oxide (SnO), etc., but the disclosure is not limit thereto. In order to reduce the ingredients of trace lines on the first substrate 102, such as aluminum (Al) or the ingredients of the substrate, such as boron (B) ions, from diffusing to other layers on the first substrate 102 at a high temperature during the process to result in a decrease in stability or causing functional variation, the buffer layer 600 can thus be used to isolate the first substrate 102 from other layers (e.g. the dielectric layer 602 or the cover layer 604). The cover layer 604 may be used to reduce the water, oxygen or environmental metal ions to degrade the metallic materials in the electronic device 100.

Figure 7:
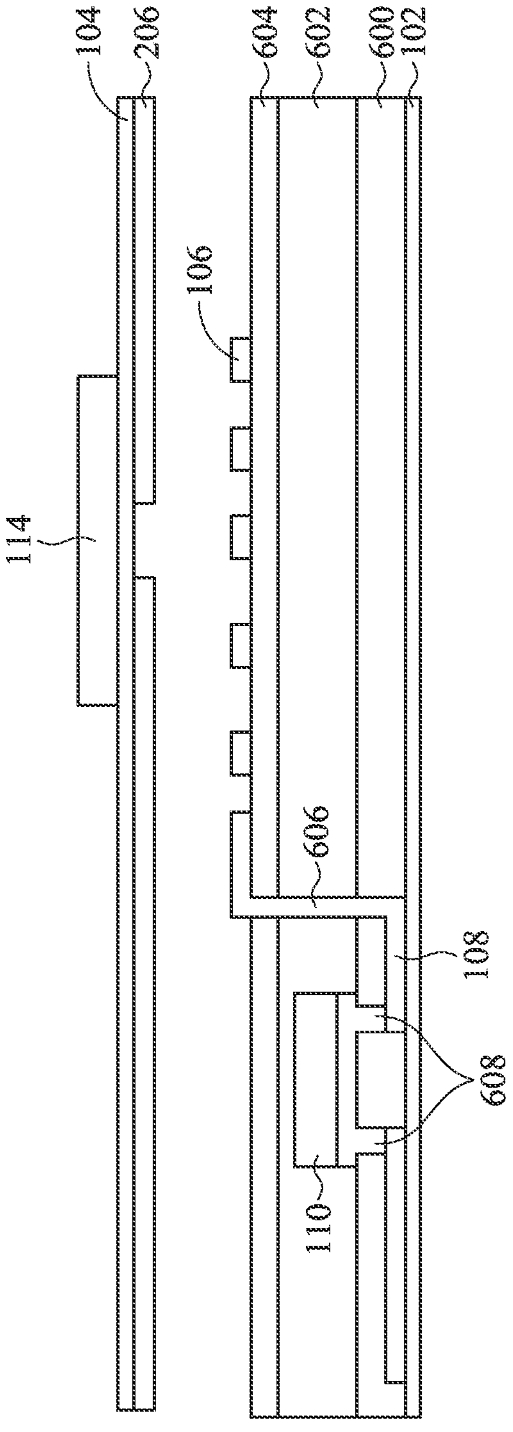
FIG. 7 is a schematic diagram of another internal structure of the electronic device in FIG. 5 in accordance with some embodiments of the disclosure.
Figure 8:
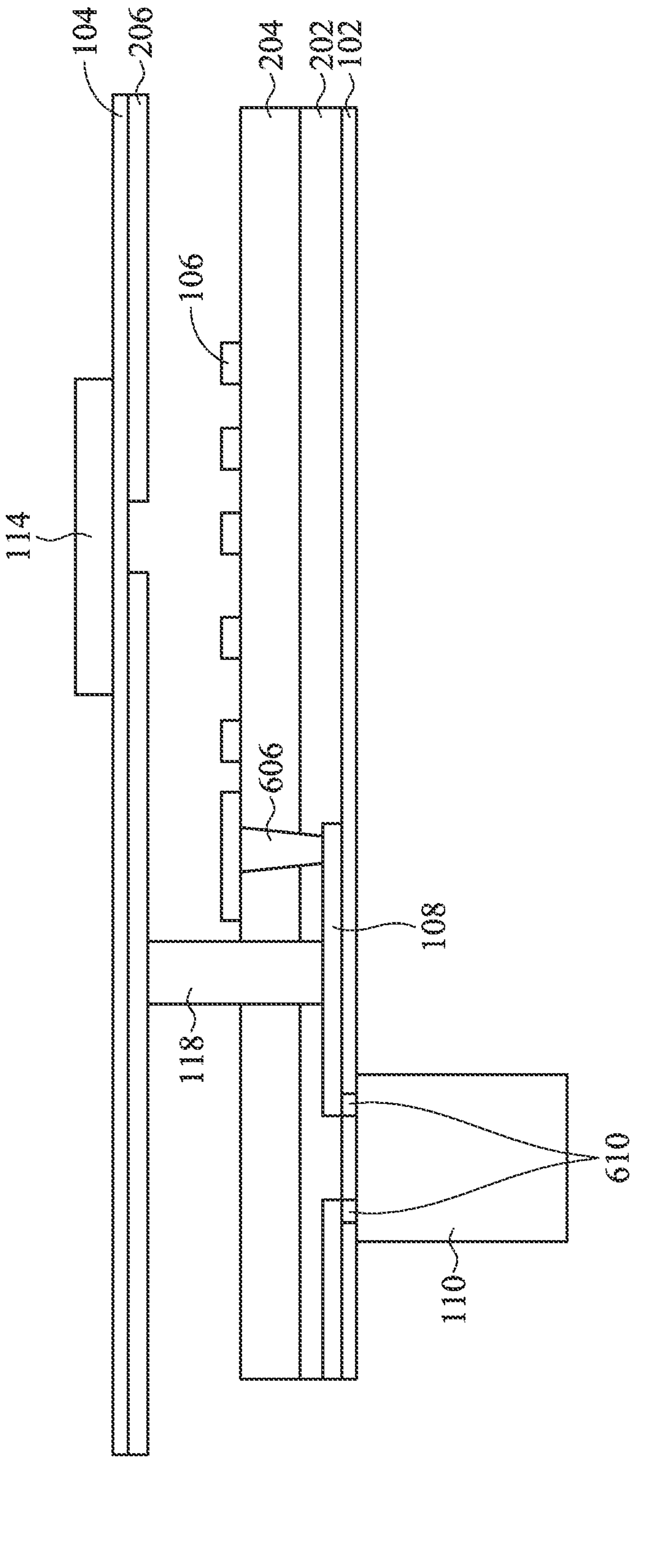
FIG. 8 is a schematic diagram of an internal structure of the electronic device in accordance with some embodiments of the disclosure.

FIG. 7 is a schematic diagram of another internal structure of the electronic device in FIG. 5 in accordance with some embodiments of the disclosure. as shown in FIG. 7, the radio frequency signal processor 110 is formed by a semiconductor manufacturing process, such as a lithography process, on the first substrate 102 to form a main circuit therein, and is coupled to the feeding structure 108 by a through hole structure 608. After the fabrication of the radio frequency signal processor 110, the dielectric layer 602 and the cover layer 604 are sequentially disposed on the radio frequency signal processor 110. FIG. 8 is a schematic diagram of an internal structure of the electronic device in accordance with some embodiments of the disclosure. As shown in FIG. 8, the radio frequency signal processor 110 and the phase shift 106 are disposed on different sides of the first substrate 102. In some embodiments, a through hole structure 610 is formed on the first substrate 102 by a drilling method. The through hole structure 610 passes through the first substrate 102, so that the radio frequency signal processor 110 can be electrically connected to the feeding structure 108 through the through hole structure 610. The drilling methods may include a laser drilling, an abrasive drilling, or other suitable techniques. The stitches connecting the signal process elements 110 at the drill holes may be made of copper foil, silicon aluminum oxide, or a ceramic conductive material, but the disclosure is not limited thereto. The stitches and the feeding structure are electrically coupled through the conductive material in the drill holes, and the conductive material in the drill holes may be an anisotropic conductive film (ACF) conductive paste or a solder material, but the disclosure is not limited thereto. In some embodiments, the first substrate 102 and the second substrate 104 may include glass, a wafer, or a flexible substrate, but the disclosure is not limited thereto. In some embodiments, the back surface of the first substrate 102 (e.g., the side on which the radio frequency signal processor 110 is located) may be provided with at least one radio frequency signal processor 110. The electronic device 100 of FIG. 6 and FIG. 7 can fabricate the radio frequency signal processor 110 in a liquid-crystal cell (LC cell) through a photomask process.

Figure 9:
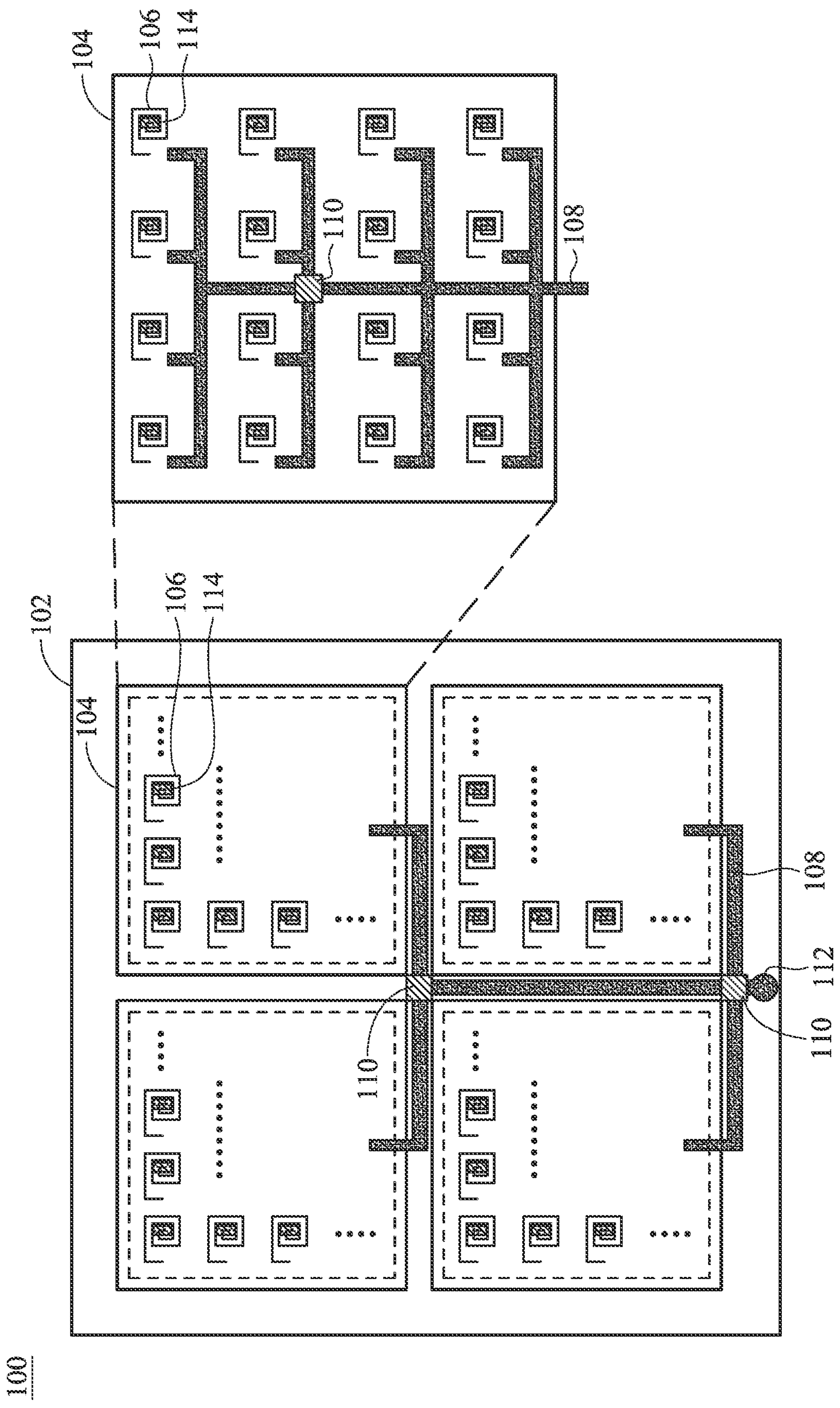
FIG. 9 is a schematic diagram of the electronic device in accordance with some embodiments of the disclosure.

FIG. 9 is a schematic diagram of the electronic device in accordance with some embodiments of the disclosure. As shown in FIG. 9, the electronic device 100, for example, may include a plurality phase shift units 106 within four blocks formed on a first substrate 102, and four second substrates 104 are respectively correspondingly covered on the phase shift units 106 within the four blocks. In other words, the second substrate 104 overlaps the phase shift units 106 along the normal direction of the first substrate 102. The radio frequency signal processor 110 may be disposed on the first substrate 102, and may be disposed between the adjacent two second substrate 104, but may not overlap the second substrate 104 along the normal direction of the first substrate 102. In some embodiments, the path of the feeding structure 108 on the first substrate 102 includes at least one radio frequency signal processor 110. In some embodiments, the radio frequency signal processor 110 can be packaged in advance, and be disposed between the first substrate 102 and the second substrate 104, as shown in, for example, a top view and enlarged view diagram of the second substrate 104 on the right side of FIG. 9. At least one radio frequency signal processor 110 may be allowed to be placed on the first substrate 102, and at least one of the radio frequency signal processor 110 overlaps the second substrate 104.

Figure 10:
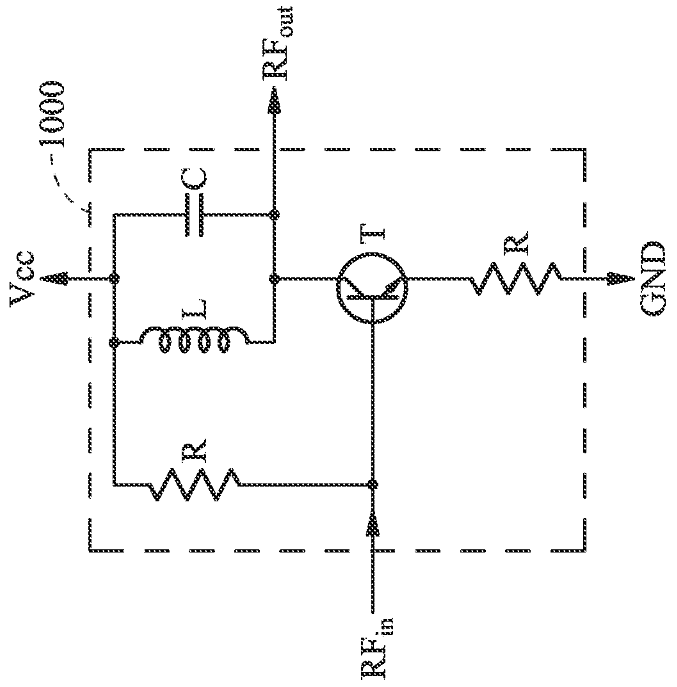
FIG. 10 is a schematic diagram of a radio frequency signal processor in accordance with some embodiments of the disclosure.

FIG. 10 is a schematic diagram of a radio frequency signal processor 110 in accordance with some embodiments of the disclosure. As shown in FIG. 10, the radio frequency signal processor 110 includes an equivalent circuit 1000. The equivalent circuit 1000 includes at least one inductor L, at least one capacitor C, at least one resistor R, and at least one gain transistor T. In some embodiments, the gain transistor T may be a bipolar junction transistor (BJT) or a hetero-junction field effect transistor (JFET), but the disclosure is not limited thereto. An input terminal $RF_{in}$ of the equivalent circuit 1000 is for receiving a radio frequency signal, and an output terminal $RF_{out}$ of the equivalent circuit 1000 is for outputting the radio frequency signal altered by the equivalent circuit 1000. Referring FIG. 10 as an example, the gain transistor T is a BJT, the emitter of the gain transistor T is coupled to the ground GND via a resistor R, and the collector of the gain transistor T is coupled to an input operating voltage Vcc via an inductor L and a capacitor C. Also, the inductor L and the capacitor C are connected in parallel with each other, and the collector of the gain transistor T is further coupled to the output terminal $RF_{out}$ of the equivalent circuit 1000. The base of the gain transistor T is coupled to the input operating voltage Vcc via a resistor R, and is further coupled to the input terminal $RF_{in}$ of the equivalent circuit 1000.

Figure 11:
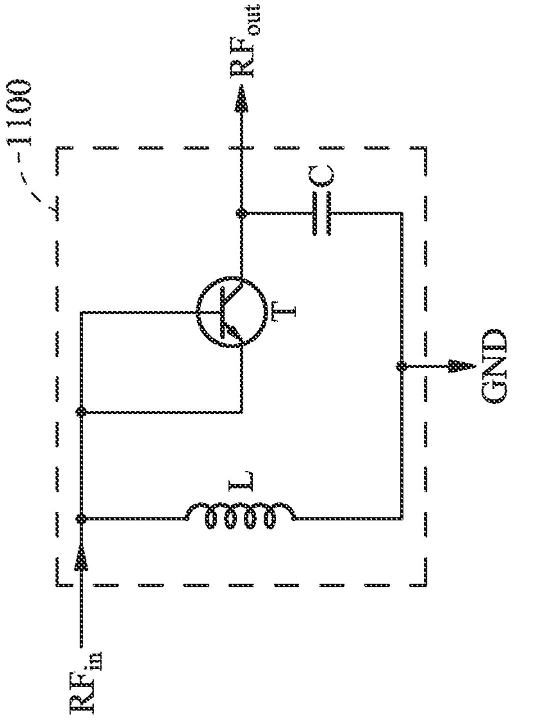
FIG. 11 is a schematic diagram of a radio frequency signal processor in accordance with some embodiments of the disclosure.

FIG. 11 is a schematic diagram of a radio frequency signal processor in accordance with some embodiments of the disclosure. As shown in FIG. 11, the radio frequency signal processor 110 includes an equivalent circuit 1100. The equivalent circuit 1100 includes at least one inductor L, at least one capacitor C, at least one resistor R, and at least one gain transistor T. In some embodiments, the gain transistor T may be a bipolar junction transistor (BJT) or a hetero-junction field effect transistor (JFET), but the disclosure is not limited thereto. An input terminal $RF_{in}$ of the equivalent circuit 1100 is for receiving a radio frequency signal, and an output terminal $RF_{out}$ of the equivalent circuit 1100 is for outputting the radio frequency signal altered by the equivalent circuit 1100. Referring FIG. 11 as an example, the gain transistor T is a BJT, the emitter of the gain transistor T is coupled to the base thereof, the emitter of the gain transistor T is coupled to the ground GND via an inductor L, and the emitter of the gain transistor T is coupled to an input terminal $RF_{in}$ of the equivalent circuit 1100. The collector of the gain transistor T is coupled to the ground GND via a capacitor C, and the collector of the gain transistor T is coupled to an output terminal $RF_{out}$ of the equivalent circuit module 1100. It should be noted that the layouts of the equivalent circuit 1000 and the equivalent circuit 1100 are only exemplary, the disclosure is not limited thereto.

In some embodiments, the radio frequency signal processor 110 receives a radio frequency signal, and provides an altered radio frequency signal to the phase shift units 106 through the feeding structure 108. In some embodiments, the radio frequency signal is intensified. To be more specific, the radio frequency signal processor 110 can include an amplifier to amplify the amplitude of the received radio frequency signal. Referring to FIG. 10 as example, when the radio frequency signal processor 110 includes an amplifier, the resistance of the resistor R can range from 50 ohms to 104 ohms (50 ohms≤resistor R≤104 ohms), and the inductance of the inductor L can range from 1 nH to 1000 nH (1 nH≤inductor L≤1000 nH), and the capacitance of the capacitor C can range from 1 pF to 1000 pF (1 pF≤capacitor C≤1000 pF), and the resistance, the inductance, and the capacitance can be correspondingly adjusted according to the frequency of the radio frequency signal and the gain of the amplifier, but the disclosure is not limited thereto. In some embodiments, the radio frequency signal processor 110 can perform as an amplifier having a gain ranging from greater than 1 and less than or equal to 100 (1<gain≤100). In some embodiments, the waveform of the radio frequency signal is adjusted. To be more specific, the radio frequency signal processor 110 includes a waveform adjuster to convert the waveform of the received radio frequency signal from the original sine wave to a square wave, a triangular wave, or a sawtooth wave. In some embodiments, the radio frequency signal processor 110 includes a half-wave rectifier for half-wave rectifying the received radio frequency signal, or the radio frequency signal processor 110 includes a wave width modulator for adjusting the cycle time (or frequency) of the received radio frequency signal, but the disclosure is not limited thereto. In some embodiments, the radio frequency processor is for noise reduction. To be more specific, the radio frequency signal processor 110 includes a noise filter for filtering (high frequency) noises or ripples included in the received radio frequency signal, but the disclosure is not limited thereto.

The electronic device 100 of the present disclosure may include a plurality of radio frequency signal processors 110 with different functions, and the radio frequency signal processors 110 with different functions may be coupled to the feeding structure 108. For example, three radio frequency signal processors 110 can be placed in series in a section of the feeding structure 108. The first radio frequency signal processor 110 is used to amplify the amplitude of the received radio frequency signal, and then the second radio frequency signal processor 110 is used to filter the noise in the received radio frequency signal, and finally the third radio frequency signal processor 110 is used to adjust the period of the received radio frequency signal, but the disclosure is not limited thereto. In addition, the electronic device 100 of the present disclosure may also include a plurality of radio frequency signal processors 110 having the same function or partially the same function.

The ordinals in the specification and the claims of the present disclosure, such as "first", "second", "third", etc., has no sequential relationship, and is just for distinguishing between two different devices with the same name. In the specification of the present disclosure, the word "couple" refers to any kind of direct or indirect electronic connection. The present disclosure is disclosed in the preferred embodiments as described above, however, the breadth and scope of the present disclosure should not be limited by any of the embodiments described above. Persons skilled in the art can make changes, recombination and modifications without departing from the spirit and scope of the disclosure. The scope of the disclosure should be defined in accordance with the following claims and their equivalents.

What is claimed is:

1. An electronic device, comprising:

a chip;

a first insulating layer, surrounding to the chip and comprising a first portion and a hole;

a metal layer, overlapped the first insulating layer;

a first conductive structure, disposed in the hole; and a second insulating layer, surrounding to the chip, comprising a second portion, wherein at least part of the second insulating layer is surrounded by the first insulating layer;

wherein the chip is electrically connected to the metal layer through the first conductive structure;

wherein in a cross-sectional view:

the first portion is disposed between the second portion and the first conductive structure;

the second portion is interposed between the first portion and the chip; and a virtual extension line is defined by a bottom surface of the chip, the first portion has a first width corresponding to the virtual extension line, the second portion has a second width corresponding to the virtual extension line, and the first width is greater than the second width.

2. The electronic device as claimed in claim 1, wherein the metal layer is higher than the chip along a thickness direction of the first insulating layer.

3. The device as claimed in claim 1, wherein the second insulating layer is disposed between the first insulating layer and the metal layer.

4. The electronic device as claimed in claim 3, wherein a thickness of the second insulating layer is different from a thickness of the first insulating layer.

5. The electronic device as claimed in claim 1, further comprising:

a line, electrically connected between the chip and the first conductive structure.

6. The electronic device as claimed in claim 1, further comprising:

a second conductive structure, disposed under the chip.

7. The electronic device as claimed in claim 6, wherein the first conductive structure is higher than the second conductive structure along a thickness direction of the first insulating layer.

* * * * *